United States Patent Office 3,562,906
Patented Feb. 16, 1971

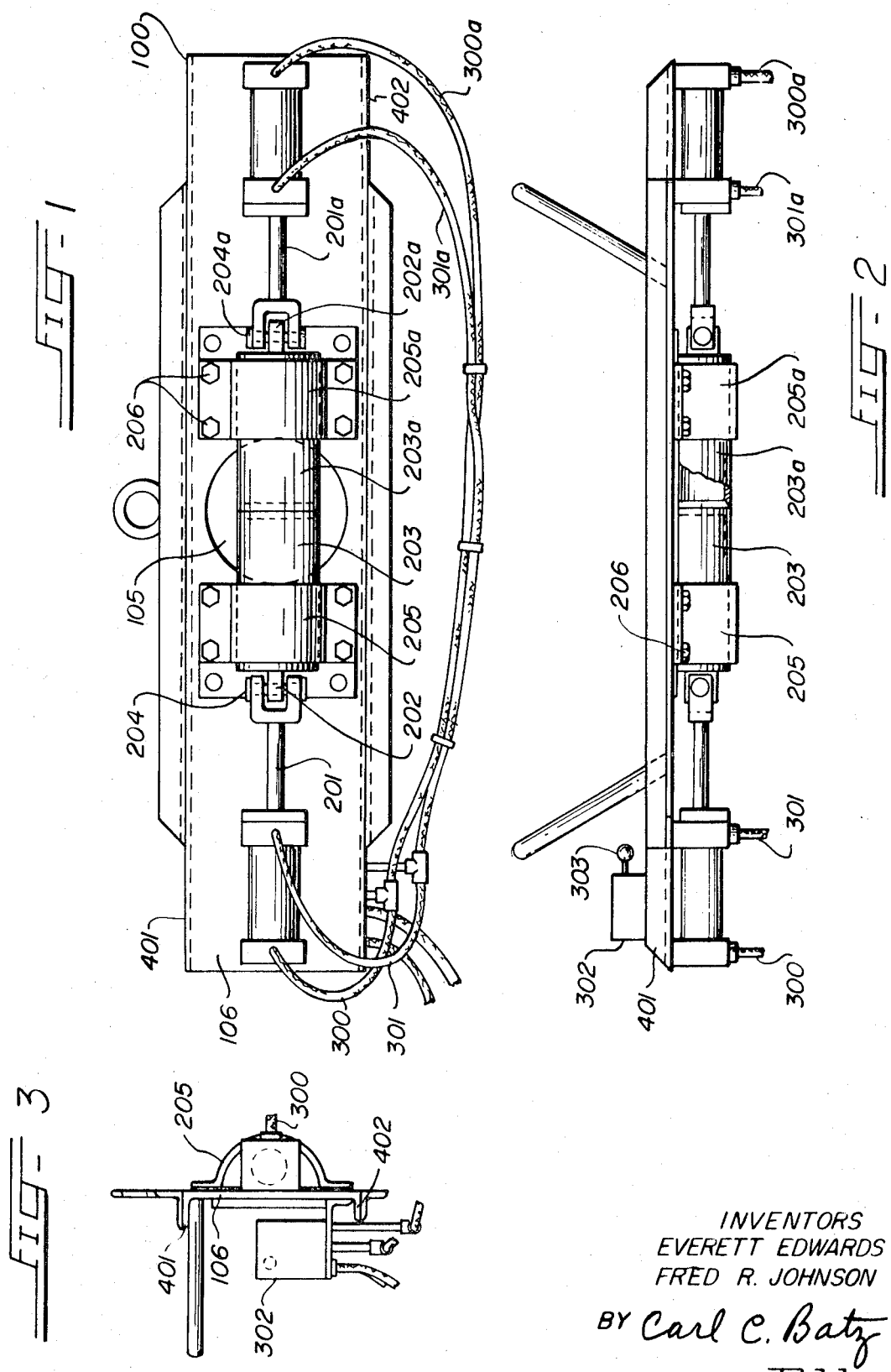

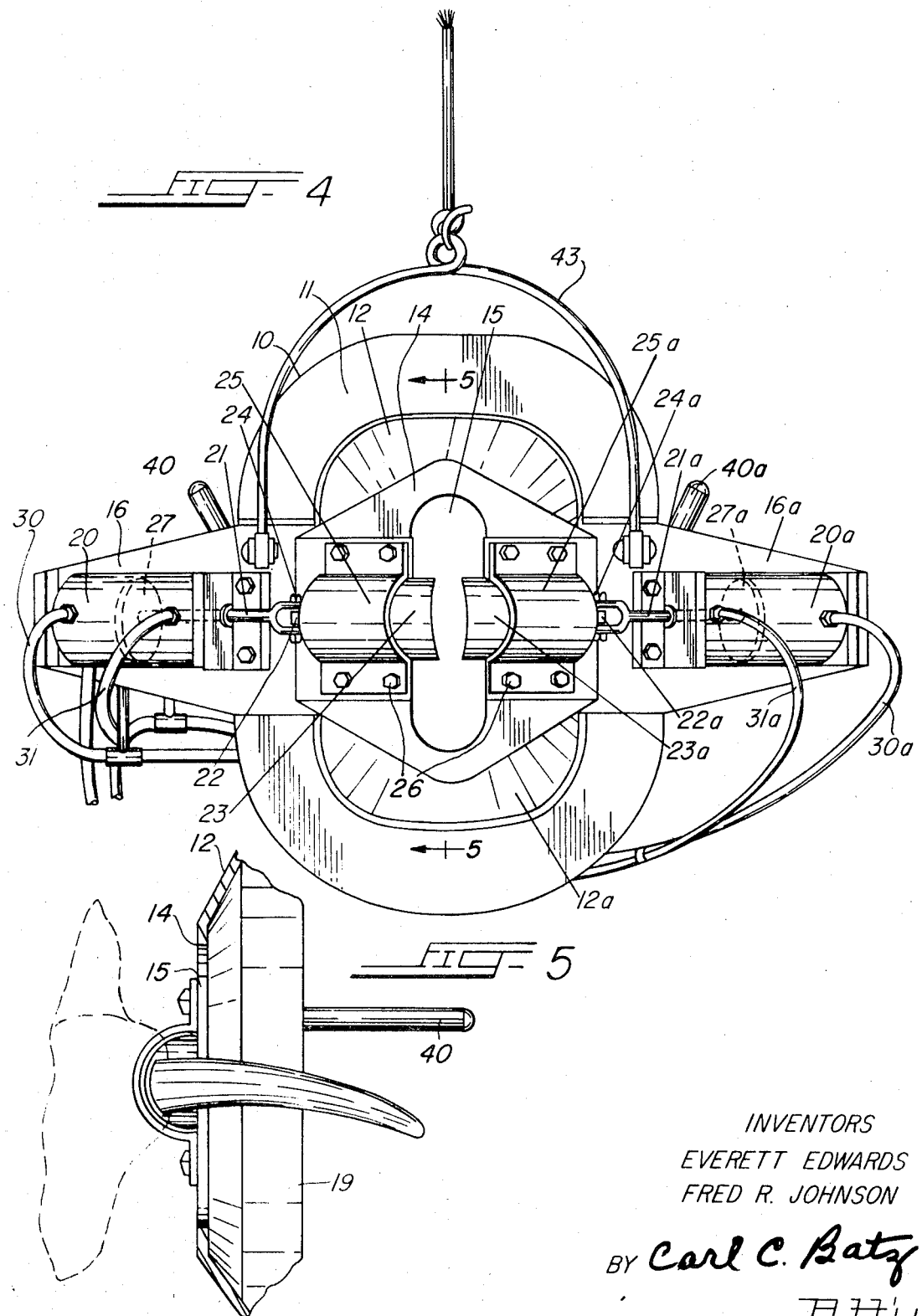

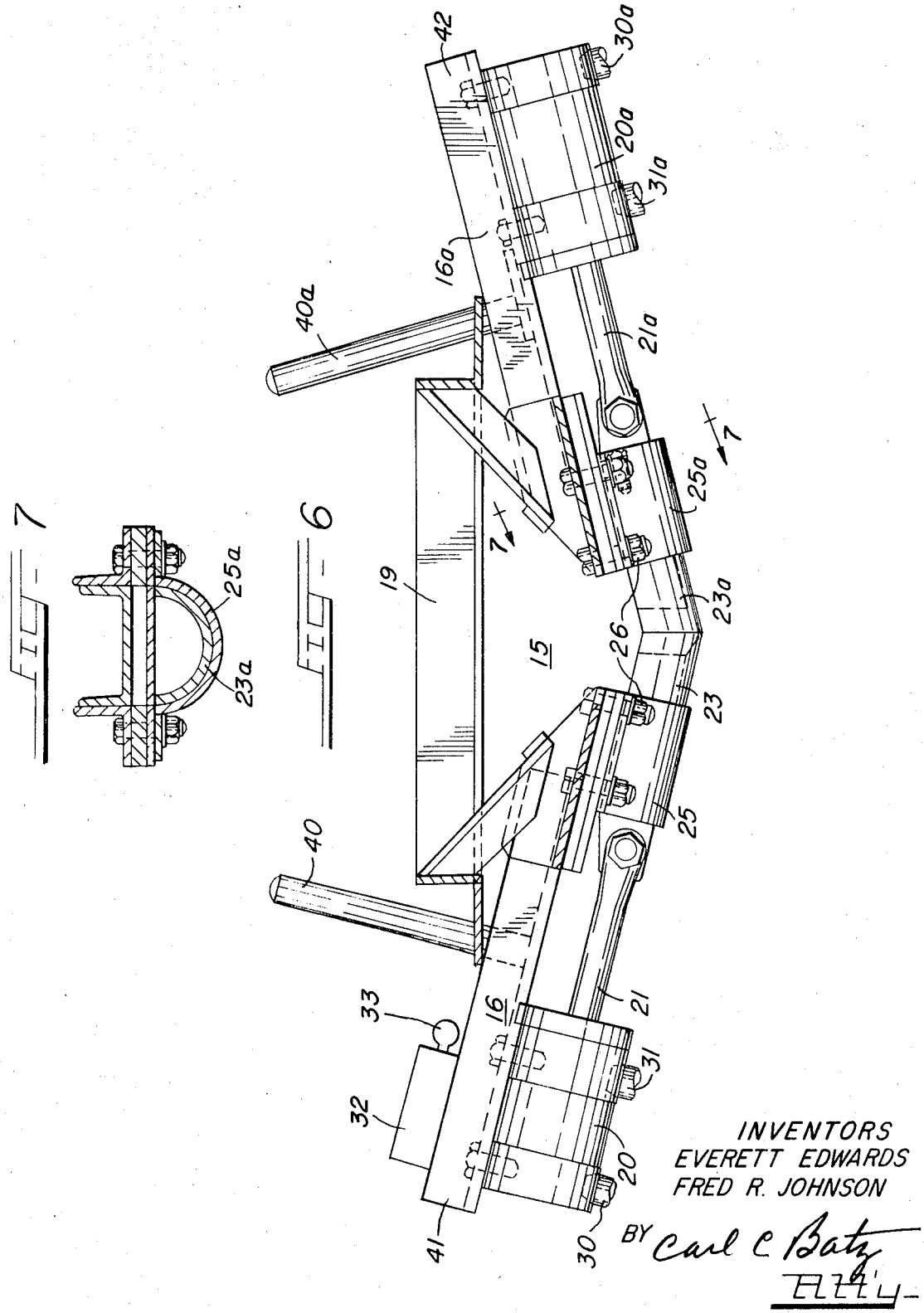

3,562,906
ANIMAL HORN CUTTING DEVICE
Everett Edwards and Fred R. Johnson, St. Paul, Minn., assignors to Armour and Company, Chicago, Ill., a corporation of Delaware
Filed Oct. 28, 1968, Ser. No. 771,053
Int. Cl. B26b 17/00
U.S. Cl. 30—180
18 Claims

ABSTRACT OF THE DISCLOSURE

An apparatus for cutting the horns from animal carcasses. Cutting blades mounted in a frame close together in a manner to insure cutting of the horn at or below the surface of the skull.

BACKGROUND OF THE INVENTION

This invention relates the removal of horns from animal carcasses, with particular application to the removal of horns from livestock carcasses incident to slaughtering and packing operations.

The complete and efficient removal of the horns from livestock carcasses during slaughter and butchering operations has been a continuing problem in the meat packing industry. Several methods, both manual and mechanical, have been developed, although none have proven entirely satisfactory in use on a large scale basis.

One simple method used extensively for years consists of manually chopping the horns from the carcass with an axe, cleaver or similar device. Although simple, this method results in incomplete removal of the horn at the skull, or removal of excessively large portions of the skull along with the horn. This latter event produces attendant damage to the hide and other salable portions of the animal head. Moreover, with animals having large, well-developed horns, this manual technique is laborious and time-consuming.

Various mechanical devices have been developed to perform the horn removing function, most generally in the form of a type of powered shears. However, these devices are not generally adapted to remove the horn precisely at the interface of the horn and skull or below the surface of the skull. Rather these devices generally clip the horn above the skull interface, leaving a horn stub or nubbin.

In order to provide more powerful equipment, permanently fixed horn cutters have been suggested. However, the use of this equipment requires that the head of the animal be removed in order to be carried to the fixed equipment for removal of the horns. These steps consume costly labor time, especially in large scale commercial operations. Additionally, the repeated handling of the animal head may cause contamination resulting in possible rejection of otherwise valuable meat portions upon inspection. Furthermore, this type of equipment is not suited for use in conjunction with a hide removing process whereby the hide is pulled over the head while the head is intact on the carcass.

SUMMARY OF THE INVENTION

It is an object of the present invention therefore to provide an apparatus for removal of the horns from animal carcasses in a simple, rapid and efficient manner.

A further object is to provide an apparatus which will cut the horn at the interface of the horn and the skull or just under the surface of the skull leaving none of the horn on the skull.

A further object of the invention is to provide a portable horn cutting apparatus of sufficient power to remove the large, fully-developed horns from animals such as beef cattle.

A still further object of the invention is to provide a horn cutting apparatus which does not require prior removal of the animal head in its operation.

Other objects and advantages of the invention become apparent as the specification proceeds.

The present invention describes an apparatus and method for removing the horns from animal carcasses in which the apparatus may comprise a frame having a horn receiving aperture, cutting blades operably mounted on at least two sides of the horn receiving aperture so as to close together toward the center of the aperture. Each cutting blade operates in linear motion, preferably each blade moves along the same linear path such that corresponding points on opposite blades move in the same plane. Alternatively, the cutting blades may be adapted to move in intersecting paths of movement, such that corresponding points on opposite blades move in intersecting planes. Power means is provided to advance and retract the cutting blades.

Preferred embodiments of the apparatus of the invention will be more specifically described by reference to the accompanying drawings in which:

FIG. 1 is a front view in elevation of one embodiment wherein the cutting blades are moveable in the same linear path, FIG. 2 is a plan view of the same embodiment and FIG. 3 is a partial end view of the same embodiment.

FIG. 4 is a front view in elevation of another embodiment of the apparatus wherein the cutting blades are moveable in intersecting paths, FIG. 5 is a partial section view taken along line 5—5 in FIG. 4, FIG. 6 is a plan view of the embodiment shown in FIG. 4 and FIG. 7 is a partial section view taken along line 7—7 in FIG. 6.

Referring specifically to the drawings, a channel mounting frame 100 is provided having web portion 106 and flange portions 401 and 402. An aperture 105 is provided in web portion 106, preferably the aperture is centered in channel mounting frame 100.

Cutting blades 203 and 203a are provided on the flat side of the channel mounting frame 106, that is the side opposite flange portions 401 and 402, on opposing sides of aperture 105.

The cutting blades are held in place against web portion 106 by means of blade guide members 205 and 205a which are secured to web portion 106 by bolt fastener 206. Blade guide members 205 and 205a allow the cutting blades 203 and 203a to be slidably moved along web portion 106 in a linear path, such that the cutting blades may be retracted approximately to the periphery of aperture 105 and advanced so as to come together within aperture 105.

Cutting blades 203 and 203a are provided with outward projections 202 and 202a respectively adapted to be fastened to the bifurcated portion of piston rods 201 and 201a by means of clevis pins 204 and 204a.

Hydraulic cylinder 200 and 200a are mounted to web portion 106 outwardly of cutting blades 203 and 203a, piston rods 201 and 201a being operably mounted for reciprocating movement within the cylinders. Cylinder 200 and 200a are centered on web portion 106 thereby allowing piston rods 201 and 201a and cutting blades 203 and 203a to move in the same linear path. It is preferred to adjust the position of cylinders 200 and 200a and/or the length of piston rods 201 and 201a so that when the piston rods are fully extended from the cylinders, the cutting blades 203 and 203a will just meet within aperture 105. If desired, the connection of outward projections 202 and 202a with piston rods 201 and 201a may be adjusted by the use of shims and the like in order to compensate for any slight decrease in the length of the cutting blades through sharpening.

In order to provide the reciprocal motion of the piston rods, hydraulic fluid lines 300, 300a, 301 and 301a are attached to cylinders 200 and 200a by means of conventional hydraulic fittings.

It is preferred that hydraulic fluid lines be provided at each end of each cylinder in order that the pistons may be urged in two directions within the cylinder by means of hydraulic fluid pressure. The apparatus is not limited to this arrangement however and may include a cylinder-piston arrangement wherein the piston is urged in a first direction by means of hydraulic pressure and is reciprocated by means of a spring or other suitable device.

It is also preferred that all of the hydraulic fluid lines feed into a common valve junction 32. In this manner the hydraulic system of the apparatus can be operated with a single control lever 303.

Handle means 400 and 400a project rearwardly from frame 100, allowing a single operator to easily maneuver the apparatus into various positions. Preferably one such handle means is located in close proximity to control lever 303 to allow the operator to actuate the control lever while gripping both handle means.

The strength and rigidity of channel mounting frame 100 may be increased by the addition of angle brackets 404 and 405 which are preferably welded to flange portions 401 and 402.

If desired, support means 403 may be attached to frame 100, to which a rope or cable may be attached, the free end of the rope or cable then being attached to an overhead support means (not shown) of a type known in the art, such as a counter-balancing weight suspended from a mono-rail carriage, beam, ceiling or the like. In this manner the weight of the device may be borne by the overhead support means leaving the operator free to maneuver and actuate the device without the burden of the weight of the device.

It should be noted that cutting blades 203 and 203a are arcuately shaped with the curve of the arc projecting forwardly from frame 100. Preferably the cutting blades are semi-cylindrical. Through the unique provision of arcuate blades movable in linear motion, the apparatus enables the operator to remove the animal horn at or beneath the horn-skull interface with a high degree of accuracy, thereby insuring the removal of the horn completely without removing excessive portions of the skull. The removal of the horn in this manner also enables the operator to remove a small area of the hide surrounding the base of the horn along with the horn. This facilitates the subsequent removal of the hide from the head of the carcass.

Still another embodiment of the apparatus is illustrated in FIGS. 4 through 7 in which the frame 10 is made up of annular collar 11 having mounted to the inner circumference thereof semi-circular portions 12 and 12a projecting forwardly therefrom. Attached to the forwardmost edges of semi-circular portions 12 and 12a is plate 14 having rearwardly inclined side portions connected at their edges to annular collar 11. The front portion of plate 14 has an aperture 15 which may be of various geometric shapes such as circular, rectangular, elliptical, but is preferably oblong-elliptical. Projecting rearwardly from collar 11 is an annular reinforcing ring 19. Projecting outwardly from collar 11 and ring 19 are wing portions 16 and 16a which are inclined at the same angle as the side portions of plate 14, shown best in FIG. 6. The angle of inclination of the sides of plate 14 and wing portions 16 and 16a is such that the planes defining their slope will intersect at a point forward of aperture 15.

Secured to wing portions 16 and 16a are hydraulic cylinders 20 and 20a having pistons 27 and 27a (shown in phantom), and piston rods 21 and 21a operably mounted therein. The interior ends of the piston rods are bifurcated to receive the outward projections 22 and 22a of cutting blades 23 and 23a. The outward projections 22 and 22a of the cutting blades are fastened to the bifurcated ends of the piston rods 21 and 21a by means of clevis pins 24 and 24a. It is preferred to position cylinders 20 and 20a so that when piston rods 21 and 21a are fully extended, the opposing surfaces of cutting blades 23 and 23a will just touch. Cutting blade guide members 25 and 25a are secured to plate 14 by bolt fasteners 26, and horn cutting blades 23 and 23a. The interior surfaces of the cutting blade guide members 25 and 25a are similarly shaped as the exterior surfaces of cutting blades 23 and 23a and closely fitted thereto, thereby restricting the movement of the cutting blades to the axis of movement of piston rods 21 and 21a.

Hydraulic fluid lines 30, 30a, 31 and 31a are attached to cylinders 20 and 20a by means of conventional hydraulic fittings. The hydraulic lines feed into a common valve junction 32 allowing the apparatus to be operated with a single control lever 33.

Projecting rearwardly from wing portions 16 and 16a are handle means 40 and 40a. Preferably control lever 33 is mounted in close proximity to one handle for ease of operation. The strength and rigidity of the apparatus is increased by the addition of reinforcing ribs 41 and 42. If desired a support means 43 can be added to the frame 10. A rope or cable depending from an overhead rail, beam or ceiling can be attached to support means 43 thereby allowing the apparatus to be hung at a convenient working level.

While cutting blades 23 and 23a can be of various shapes, it is preferred that they are arcuately shaped as shown in FIG. 7, with the curve of the arc projecting forwardly from aperture 15 as in the previously described embodiment. In this embodiment the arc of the cutting blades complements the cutting angle of incidence created by the sloping sides of plate 14 and wing portions 16 and 16a.

The fluid used in the hydraulic cylinders may be of various types including gaseous and liquid hydraulic fluids. It is preferred to use liquid hydraulic fluids in order to provide a more even, steady force on the cutting blades. The size of the cylinders employed and the amount of fluid pressure used may be varied within wide ranges depending upon the type of animal to be dehorned and the size and thickness of the horn. Excellent results have been obtained in removing the horns from beef cattle using a cylinder of three inch diameter and a hydraulic pressure capacity of 750 p.s.i. Excellent results have also been obtained with beef cattle using a cylinder of two inch diameter and a hydraulic pressure capacity of 3,000 p.s.i. The invention is not limited thereby and it can be seen that various sized cylinders and various fluid pressures can be used in accordance with standard engineering principles.

OPERATION

In order to remove a horn using the apparatus of the present invention the apparatus is placed with the horn projecting rearwardly through aperture 105. The cutting blades 203 and 203a are in the open or retracted position, preferably they do not extend into aperture 105 when in the retracted position. The apparatus is positioned so that the sides of aperture 105 adjacent the cutting blades are in contact with the animal skull on either side of the horn.

Control 303 is actuated to allow hydraulic fluid under pressure to flow into cylinders 200 and 200a through fluid lines 300 and 300a, and to allow hydraulic fluid to flow out of cylinders 200 and 200a through fluid lines 301 and 301a respectively. The action of the hydraulic fluid causes piston rods 201 and 201a and cutting blades 203 and 203a to move inwardly toward the center of aperture 105. This action is continued until the cutting blades meet at the approximate center of aperture 105, the cutting blades having passed through the skull surface surrounding the horn and coming together inside the skull below the base of the horn. It will be understood that it is preferred that the cutting blades 203 and 203a come together so that the opposing edges touch. In this manner complete severance of the horn is insured. If the cutting blades did not meet, the severance would be incomplete. On the other hand, if the blades continued to travel inwardly after coming together, they would damage each other. For this reason, it is preferred to position cylinders 200 and 200a so that when piston rods 201 and 201a are fully extended, cutting blades 203 and 203a will meet. This insures complete severance of the horn and also prevents damage to the cutting blades.

Control 303 is then actuated to allow hydraulic fluid under pressure to flow into cylinders 200 and 200a through fluid lines 301 and 301a, and to allow hydraulic fluid to flow out of the cylinders through fluid lines 300 and 300a. The action of the hydraulic fluid causes piston rods 201 and 201a and cutting blades 203 and 203a to move outwardly and away from the center of aperture 105. This action continues until the cutting blades are in their original fully retracted position. The apparatus is then ready for re-use.

It can be seen that in the operation of the embodiment shown in FIGS. 4 through 7 that due to the sloping sides of plate 14 and the fact that the cutting blades are slideably fastened against the surface of plate 14 by blade guide members 25 and 25a, the cutting blades move linearly, their paths of movement intersecting at a point forward of aperture 15, so that corresponding points on blades 23 and 23a move in intersecting planes. In this manner this particular embodiment of the apparatus allows the blades to penetrate more deeply into the skull than do cutting blades 203 and 203a which operate in the same linear path. This feature may be desirable when working with animals having particularly deep-rooted or tenacious horns.

It can be seen that in the embodiment wherein the cutting blades move in intersecting paths rather than in the same path or in parallel paths, the action of the cutting blades will create a force tending to move the skull away from the apparatus. Accordingly, an opposite or resisting force must be supplied in order to keep the skull of the animal in intimate contact with the apparatus during the cutting operations to insure the removal of the entire horn at or interior of the horn-skull interface. This force can be supplied in a variety of ways, largely depending upon the position of the animal during the dehorning procedures. For example, if the carcass were laid on the floor, the resisting force could be supplied by the floor. In the preferred use of the apparatus the carcass is suspended by the hind legs from an overhead conveyor rail. In this instance, the resisting force can be supplied by a man exerting a pushing force from the opposite side of the carcass from that on which the apparatus is being used. Moreover, if the carcass is suspended close to a wall, the wall could supply the resisting force. It may be desired however, to use the apparatus to dehorn suspended carcasses when there is not a wall conveniently located, and a man is not available for this task. Accordingly, it is preferred to utilize the weight and inertia of the carcass itself to supply the resisting force.

It is preferred when using this particular embodiment that the carcass is suspended by the hind legs from an overhead rail. The apparatus is placed with the horn protruding through aperture 105 as hereinbefore described in detail.

As plate 14 is brought into contact with the skull, the operator provides a further pushing motion which swings the carcass slightly away from its previously vertical position. In this manner, two components of the gravity force created by the weight of the animal are set up; the vertical component being directed downwardly and the horizontal component directed toward the original vertical position of the carcass. That is, the carcass having been displaced from the vertical will tend to swing back to recover its original vertical position. The force tending to return the carcass to the vertical is then utilized as the resisting force to the action of the cutting blades. In this manner the skull can be kept in intimate contact throughout the cutting steps without the necessity of the use of additional external structures or additional manpower.

While in the foregoing specification the structure of the apparatus and its operation have been set out in considerable detail for illustrative purposes, the preferred embodiments having also been set out in detail, it is to be understood that the invention is not limited thereby, and that considerable variations can be made by those skilled in the art without departing from the spirit or scope of the invention.

What is claimed is:

1. A dehorner apparatus comprising a frame having a periphery defining an aperture, arcuate cutting blades mounted on at least two sides of said periphery moveable toward each other in linear motion so as to sever a horn positioned within the aperture, said blades being arcuate in their transverse cross section.

2. A dehorner apparatus comprising a frame having a periphery defining an aperture, arcuate cutting blades mounted on opposing sides of said periphery moveable toward each other in linear motion to sever a horn positioned within the aperture, said cutting blades moving in a linear path, said blades being arcuate in their transverse cross section.

3. The apparatus according to claim 2 wherein said cutting blades are semi-cylindrical.

4. A dehorner apparatus comprising a frame having an essentially flat rectangular plate portion having an aperture therein, arcuate cutting blades, mounted on said plate portion on opposing sides of the aperture, power means communicaing with said cutting blades adapted to move said cutting blades toward each other in a linear path to sever a horn protruding through the aperture, said blades being arcuate in their transverse cross section.

5. The apparatus according to claim 4 wherein said power means includes hydraulically operated piston rods so positioned that said cutting blades meet only when said piston rods are fully extended.

6. A dehorner apparatus comprising a frame having a periphery defining an aperture, a first arcuate cutting blade operably mounted on one side of said periphery moveable in a first path, a second arcuate cutting blade operably mounted on a second side of said periphery moveable in a second path, said first and second paths being intersecting linear paths, and power means operably connected to said cutting blade to move said blades in said paths, to sever a horn positioned within the aperture of said frame.

7. A dehorner apparatus comprising a frame having a periphery defining an aperture, two opposing sides of said periphery being sloped rearwardly, wing portions extending outwardly and rearwardly from said opposing sides and having the same slope as said sides, each of said wing portions having a hydraulic cylinder attached thereto, said cylinders having a piston and piston rod adapted for reciprocating movement therein, arcuate cutting blades communicating with said piston rods adapted for linear movement along said opposing sides of said periphery, said cutting blades closing together to sever a horn positioned within the aperture.

8. The apparatus according to claim 7 wherein said cylinders are positioned so that said cutting blades meet only when said piston rods are fully extended from said cylinders.

9. A process for removing the horns from livestock carcasses by positioning a horn within an aperture so that the periphery defining the aperture contacts the animal's skull in the area of the base of the horn and moving cutting blades, arcuate in their transverse cross section, through the horn and skull surfaces so that the cutting edges of said blades meet at the interface of the skull or below.

10. The process according to claim 9 wherein said cutting blades move in intersecting linear paths.

11. A process for removing the horns from livestock carcasses comprising the steps of:
  (a) positioning a horn to be removed within an aperture in a manner in which the periphery defining the aperture contacts the animal skull in the area of the base of the horn,
  (b) passing arcuate cutting blades from at least two sides of said aperture through the horn and skull surfaces; said cutting blades moving linearly in paths which intersect below the skull surface, and
  (c) applying a force to resist movement of the animal skull urged by the force of the cutting blades.

12. The process according to claim 11 wherein the livestock carcass is suspended vertically with the head lowermost and said force to resist movement of the animal skull is provided by gravity.

13. A dehorner apparatus comprising a frame having an essentially flat rectangular plate portion having an aperture therein, blades mounted on said plate portion on opposing sides of the aperture, power means for forcing said cutting blades toward each other in a linear path to sever a horn protruding through the aperture, said power means including hydraulically operated piston rods which are so limited in length that said cutting blades meet only when said piston rods are fully extended.

14. A deformer apparatus comprising a frame having a periphery defining an aperture, cutting blades mounted on opposing sides of said periphery moveable toward each other in the same plane so as to sever a horn positioned within the aperture.

15. A process for removing the horns from livestock carcasses by positioning a horn within an aperture so that the periphery defining the aperture contacts the animal's skull in the area of the base of the horn and moving blades from opposing sides towards each other in the same plane, through the horn and skull surfaces so that the cutting edges of said blades meet at the interface of the skull or below.

16. A dehorner apparatus comprising a frame having an essentially flat rectangular plate portion having an aperture therein, cutting blades, mounted on said plate portion on opposing sides of the aperture, power means communicating with said cutting blades adapted to move said cutting blades toward each other in the same plane to sever a horn protruding through the aperture.

17. A dehorner apparatus comprising of a frame having a periphery defining an aperture, cutting blades mounted on opposing sides of said periphery moveable toward each other in the same plane to sever a horn positioned within the aperture.

18. The apparatus according to claim 16 wherein said power means includes hydraulically operated piston rods so positioned that said cutting blades meet only when said piston rods are fully extended.

References Cited
UNITED STATES PATENTS

| | | | |
|---|---|---|---|
| 441,065 | 11/1890 | Green | 30—244 |
| 830,470 | 9/1906 | Webster | 30—244 |
| 2,257,245 | 9/1941 | Rudolph | 30—228 |
| 2,764,813 | 10/1956 | Hoffman | 30—228 |
| 2,766,525 | 10/1956 | Hoffman | 30—228 |
| 3,152,397 | 10/1964 | Adam | 30—180X |
| 3,177,584 | 4/1965 | Cockerill | 30—228 |

GRANVILLE Y. CUSTER, Jr., Primary Examiner

U.S. Cl. X.R.

30—182